United States Patent
Muljono

(10) Patent No.: US 6,438,636 B2
(45) Date of Patent: Aug. 20, 2002

(54) UPDATING TERMINATION FOR A BUS

(75) Inventor: Harry Muljono, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/785,005

(22) Filed: Feb. 16, 2001

Related U.S. Application Data

(63) Continuation of application No. 09/221,008, filed on Dec. 23, 1998.

(51) Int. Cl.$^7$ ............................................. G06F 13/00
(52) U.S. Cl. ........................................ 710/300; 326/30
(58) Field of Search ................................. 710/300, 305, 710/106; 326/30; 327/111

(56) References Cited

U.S. PATENT DOCUMENTS

| | | | |
|---|---|---|---|
| 5,467,455 A | 11/1995 | Gay et al. | 395/281 |
| 5,546,016 A | 8/1996 | Allen | 326/30 |
| 5,680,060 A | 10/1997 | Banniza et al. | 326/30 |
| 5,687,330 A | 11/1997 | Gist et al. | 395/309 |
| 5,936,429 A | 8/1999 | Tomita | 326/82 |
| 6,026,456 A | 2/2000 | Ilkbahar | 710/101 |
| 6,070,206 A | 5/2000 | Lohmeyer et al. | 710/101 |
| 6,078,978 A | 6/2000 | Suh | 710/129 |
| 6,092,212 A | 7/2000 | Mulijono et al. | 713/600 |
| 6,130,563 A | 10/2000 | Pilling et al. | 327/111 |

*Primary Examiner*—Peter Wong
*Assistant Examiner*—X. Chung-Trans
(74) *Attorney, Agent, or Firm*—Schwegman, Lundberg, Woessner & Kluth, P.A.

(57) ABSTRACT

Updating termination for a bus. According to one embodiment of the present invention, a signal on a line is damped, an edge in the signal is detected and the damping is modified after the edge is detected and before a subsequent edge in the signal is detected.

27 Claims, 9 Drawing Sheets

UPDATING TERMINATION FOR A BUS

This application is a continuation of U.S. Ser. No. 09/221,008, filed Dec. 23, 1998.

FIELD OF THE INVENTION

The invention relates generally to buses for processor based systems, and more particularly to updating termination for a bus.

BACKGROUND

Computer systems include a processor, one or more memory devices, and one or more input-output or I/O devices. The processor, the memory devices, and the I/O devices communicate with each other through a bus in the computer system. A bus is a communication link comprising a set of wires or lines connected between the devices listed above. The bus is shared by the devices as they communicate with one another. A bus may also be a set of lines connected between two functional circuits in a single integrated circuit. The bus generally contains a set of control lines and a set of data lines. The control lines carry signals representing requests and acknowledgments and signals to indicate what type of data is on the data lines. The data lines carry data, complex commands, or addresses. A separate set of lines in the bus may be reserved to carry addresses, and these are called address lines. The devices communicate with each other over the bus according to a protocol that governs which devices may use the bus at any one time. The protocol is a set of rules governing communication over the bus that are implemented and enforced by a device that is appointed a bus master. Generally the processor is the bus master, although there may be more than one bus master. Each bus master initiates and controls requests to use the bus.

Two different schemes exist for organizing communication on a bus. A synchronous bus includes a clock pulse in the control lines and is governed by a protocol based on the clock pulse. An asynchronous bus does not rely on a clock pulse to organize communication. Rather, the asynchronous bus is coordinated by a handshaking protocol under which a sender communicates directly with a receiver to transfer data based on a series of mutual agreements. The sender and the receiver exchange a set of handshaking signals over the control lines before, during, and after each data transfer.

Signals are exchanged between the sender and the receiver over the bus in the following manner. The sender includes a separate driver circuit, typically including a tri-state buffer, connected to each bus line it is to send signals to. Likewise, the receiver has a separate receiver circuit connected to each bus line it is to receive signals from. Typically the receiver circuit is a high impedance buffer circuit such as an inverter. When the sender sends a signal on a particular line it directs the appropriate driver circuit to bring the line to a suitable voltage, either high or low. The receiver detects the signal in the appropriate receiver circuit to complete the communication. A reflection of the signal can take place if an input impedance of the receiver circuit or an output impedance of the driver circuit is different from the characteristic impedance of the line. The discontinuity in the impedance causes the reflection. The signal is reflected back and forth along the line and the reflections must dissipate before a new signal can be sent on the line. This slows the operation of the bus and the computer system.

A conventional method of reducing reflection on a bus line is to damp or dissipate the reflections with a termination in a driver circuit or a receiver circuit connected to the bus line. A termination is a dissipating or damping load, typically a resistive device, which has an impedance that substantially reduces a difference between the input impedance of the receiver circuit or the output impedance of the driver circuit and the characteristic impedance of the line. Two types of termination are used. A source termination comprises an impedance placed in a driver circuit connected to a bus line. A parallel termination comprises impedances placed in a receiver circuit and a driver circuit so that impedances are placed at both ends of a bus line.

In some high speed bus structures the implementation of termination techniques to reduce reflection interferes with the quality and speed of signal transfer. There remains a need for a termination of lines in high speed bus structures that does not impair the quality and speed of signal transfer. For these and other reasons there is a need for the present invention.

SUMMARY OF THE INVENTION

According to one embodiment of the present invention, a signal on a line is damped, an edge in the signal is detected and the damping is modified after the edge is detected and before a subsequent edge in the signal is detected. Advantages of the invention will be apparent to one skilled in the art upon an examination of the detailed description of the preferred embodiments.

DETAILED DESCRIPTION OF THE PREFERRED EMBODIMENTS

Figure 1:
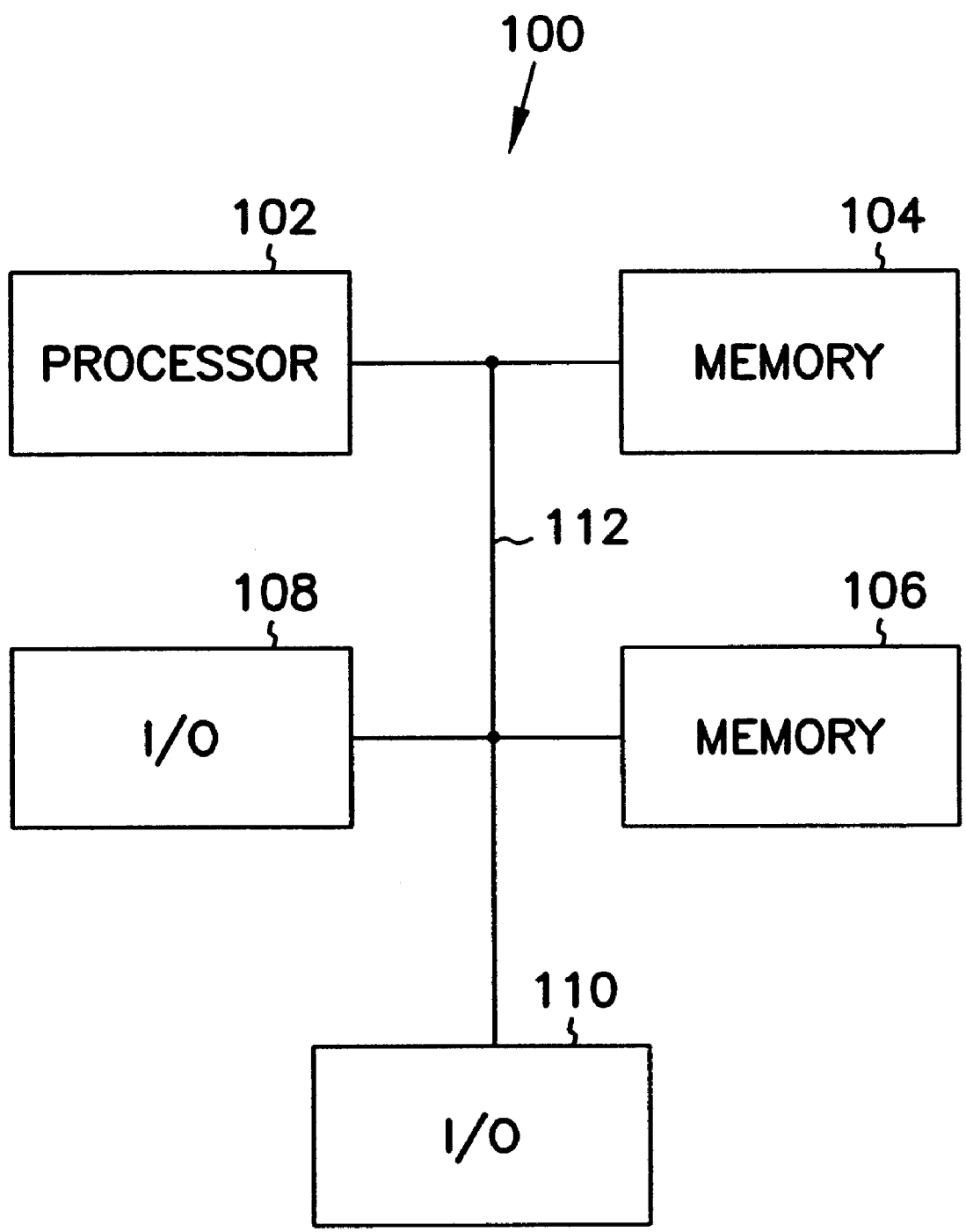
FIG. 1 is a block diagram of a computer system according to an embodiment of the present invention.

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The problem that the present invention addresses will now be described. In high speed bus structures, the use of termination techniques to reduce signal reflection often interferes with the quality and speed of signal transfer. In particular, termination is used to damp signal reflections and improve signal quality in high speed bus lines, but the implementation of termination techniques can interfere with signal quality. A line in a bus may be terminated with a termination circuit having an arrangement of impedance devices such as resistors, transistors, or both, connected to a terminal of a receiver circuit on the line. The receiver circuit may be a high impedance buffer circuit that detects and relays a binary signal from the line, the signal being either low, high, or in transition between high and low. The impedance of the termination circuit is designed to substantially reduce a difference between the impedance and the characteristic impedance of the line. However, variations in the supply voltage and the temperature of the bus and the termination circuit can change the impedance of the termination circuit and therefore cause signal reflection. In addition, if the termination circuit is fabricated in an integrated circuit chip, the fabrication process parameters may affect the impedance of the resulting termination circuit. Each termination circuit is therefore designed with several transistors that can be switched on or off during the operation of the bus to adjust the impedance of the termination circuit to substantially reduce a difference between the impedance and the characteristic impedance of the line. The state of the transistors is changed dynamically to respond to the changes in the supply voltage and the temperature. When the transistors are switched on or off the signal at the terminal is affected by the changing impedance of the termination circuit. The signal detected at the terminal by the receiver circuit is severely impaired if it is in transition from high to low or low to high when the transistors in the termination circuit are changing. The present invention described herein addresses this problem. The present invention also provides solutions to other problems not mentioned herein.

In this description the term damping refers to the dissipation of the energy of a signal on a line such as a bus line. The signal is damped to eliminate unwanted reflections in the signal. The damping is accomplished by coupling an impedance device to the line. Also, transistors will be described as being in an active state or switched on when they are rendered conductive by an appropriate control signal, and the transistors will be described as being in an inactive state or switched off when they are rendered nonconductive by the control signal.

In order to make clear the operation and advantages of the present invention it will be described in the context of an operative computer system. A block diagram of a computer system 100 according to an embodiment of the present invention is shown in FIG. 1. The computer system 100 includes several devices including a processor 102, two memory circuits 104, 106, and two input/output (I/O) devices 108, 110. Each of the memory circuits 104, 106 is either a random-access memory (RAM), a read-only memory (ROM), or a storage device such as a hard disk drive, a floppy disk drive, an optical disk drive, or a tape cartridge drive. Each of the I/O devices 108, 110 is either a monitor, a pointing device such as a mouse, a keyboard, or a modem. The devices in the computer system 100 including the processor 102, the two memory circuits 104, 106, and the two I/O devices 108, 110 communicate with each other through a bus 112 connected to the devices. Signals are sent on the bus 112 as needed by one or more of the devices, and arrive at other devices according to a protocol in which the signals begin to arrive at unpredictable times. One skilled in the art having the benefit of this description will recognize that more devices such as processors, memory circuits, and I/O devices may be connected to the bus 112.

Each of the devices in the computer system 100 has a receiver circuit and a termination circuit connected to a terminal on a line in the bus 112 to receive signals from the line. Some of the devices also have at least one driver circuit connected to a terminal on a line in the bus 112. Those skilled in the art having the benefit of this description will understand that some devices may be connected to more than one line in the bus 112 and may have more than one driver circuit and more than one combination of a receiver circuit and a termination circuit. Also, one or more terminals may each be connected to a driver circuit, a receiver circuit, and a termination circuit.

Figure 2:
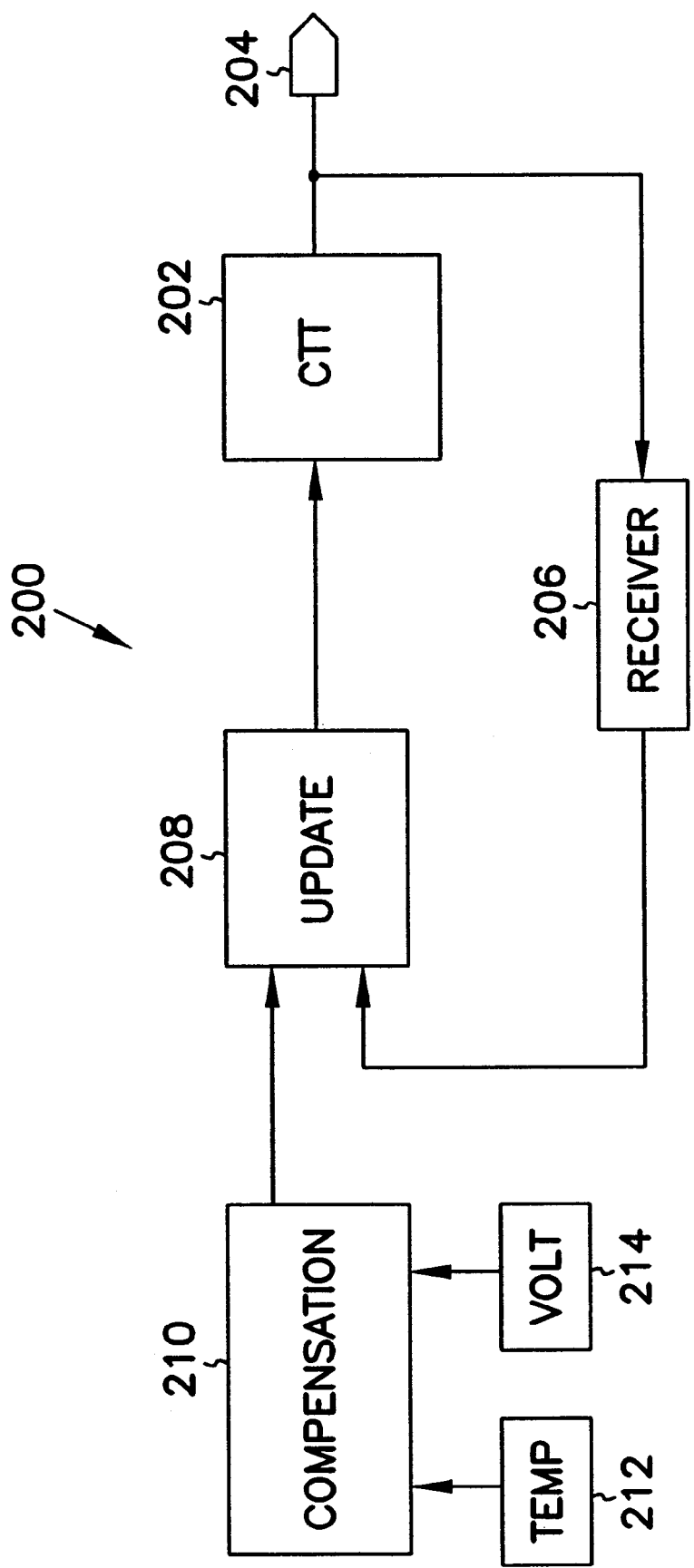
FIG. 2 is a block diagram of a receiver system according to an embodiment of the present invention.

The present invention will be more particularly described with respect to a single receiver system including a receiver circuit and a termination circuit in a device in the computer system 100. A receiver system 200 according to an embodiment of the present invention is shown in FIG. 2. The receiver system 200 includes a center-tapped termination circuit (CTT) 202 connected to a terminal 204 of a line in the bus 112. The CTT 202 has an impedance structure that damps or dissipates signal reflections in the line, and the damping is optimized when the impedance of the CTT 202 is substantially similar to the impedance of the line. The CTT 202 includes transistors that may be switched on and off to adjust the impedance of the CTT 202. A receiver circuit 206 is coupled to receive a signal from the terminal 204 and to transfer the signal to an update circuit 208 as well as to other circuits in the device (not shown) for processing. The signal at the terminal 204 may be disrupted when the state of the transistors in the CTT 202 changes. The update circuit 208 is coupled between a compensation circuit 210 and the CTT 202. The compensation circuit 210 is coupled to receive data from a temperature detection circuit 212 that detects a temperature of an integrated circuit chip including the receiver system 200 and a voltage detection circuit 214 that detects a supply voltage that is provided to the receiver system 200. Changes in the temperature or the supply voltage alter the impedance of the components in the CTT 202 during the operation of the receiver system 200 leading to a substantial difference between the impedance of the CTT 202 and the impedance of the line. The compensation circuit 210 generates a control signal for the CTT 202 based on the changing temperature and supply voltage, and the control signal is modified continuously. States of the transistors in the CTT 202 are changed by the control signal to substantially reduce a difference between the impedance of the CTT 202 and the impedance of the line. The update circuit 208 is structured to transmit the control signal from the compensation circuit 210 to the CTT 202 during moments when the signal at the terminal 204 may not be severely disrupted by a change in the impedance of the CTT 202. The impedance of the CTT 202 is thereby updated to accommodate for changed operating conditions for the computer system 100 and in particular for the receiver system 200. The operation of the receiver system 200 will be now be described within the context of a specific signal at the terminal 204.

According to an embodiment of the present invention, the signal at the terminal 204 is a strobe signal that is sent to the receiver system 200 according to a protocol to indicate that data is concurrently being transmitted to the device on other lines. The strobe signal is a square wave signal and, under the protocol, the device latches the data when a critical edge of the strobe signal is detected by the receiver circuit 206. The strobe signal may have non-critical edges as well for which no data is available to be latched by the device. One skilled in the art having the benefit of this description will understand that signals other than the strobe signal, such as a clock signal, an address signal, a data signal, or a control signal, may be sent to the terminal 204 according to alternate embodiments of the present invention.

Figure 3A:
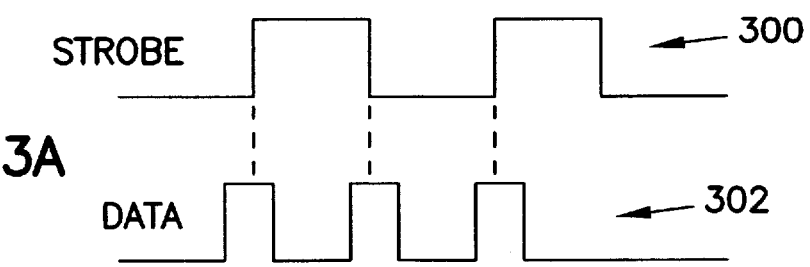
FIGS. 3A, 3B, and 3C are plots of a strobe signal and a data signal according to embodiments of the present invention.
Figure 3B:
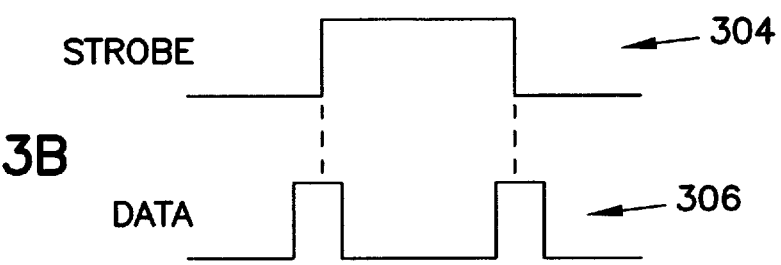
Figure 3C:
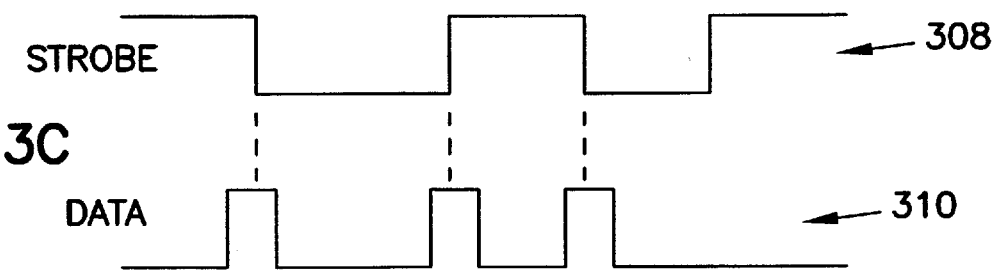

Plots of different strobe signals and data signals are shown in FIGS. 3A, 3B, and 3C according to embodiments of the present invention. A plot of a first strobe signal 300 is shown in FIG. 3A over a plot of a data signal 302. The data signal 302 includes three data pulses that occur respectively during the first three edges of the first strobe signal 300 which are critical edges. The last edge of the first strobe signal 300 is a non-critical edge because there is no coincident data pulse. A plot of a second strobe signal 304 is shown in FIG. 3B over a plot of a data signal 306. Each edge of the second strobe signal 304 is a critical edge because each edge is coincident with a data pulse. A plot of a third strobe signal 308 is shown in FIG. 3C over a data signal 310. The third strobe signal 308 is active low and has three critical edges followed by a non-critical edge. The first, second, and third strobe signals 300, 304, 308 are each unique to a particular protocol for latching the respective data signals 302, 306, 310, and the computer system 100 is operated according to one of the protocols.

The receiver system 200 is operated according to an embodiment of the present invention to substantially reduce potential disturbances of the strobe signal. The strobe signal is particularly vulnerable to disturbance in timing and signal quality by a change in the CTT 202 when it is in transistion from low to high or high to low. Therefore, the control signal is transmitted to the CTT 202 by the update circuit 208 after an edge is detected in the strobe signal, and before a subsequent edge of the strobe signal may arrive. Each square wave of the strobe signal has uniform duration defined by the protocol within which the update circuit 208 transmits the control signal, so the strobe signal is either high or low when the impedance of the CTT 202 changes. The strobe signal is therefore not substantially disturbed when the impedance of the CTT 202 changes and can be detected and verified easily. The update circuit 208 includes edge detection circuitry to detect each edge in the strobe signal, and flip flop circuitry to transmit the control signal after an edge is detected.

The update circuit 208 can be designed to transmit the control signal according to protocols employing a variety of strobe signal patterns. For example, referring to FIG. 3A, the control signal can be transmitted following the detection of a critical edge or a non-critical edge of the strobe signal 300. Additional examples of protocols for updating the impedance of the CTT 202 will be described in the context of a more detailed description of the CTT 202.

Figure 4:
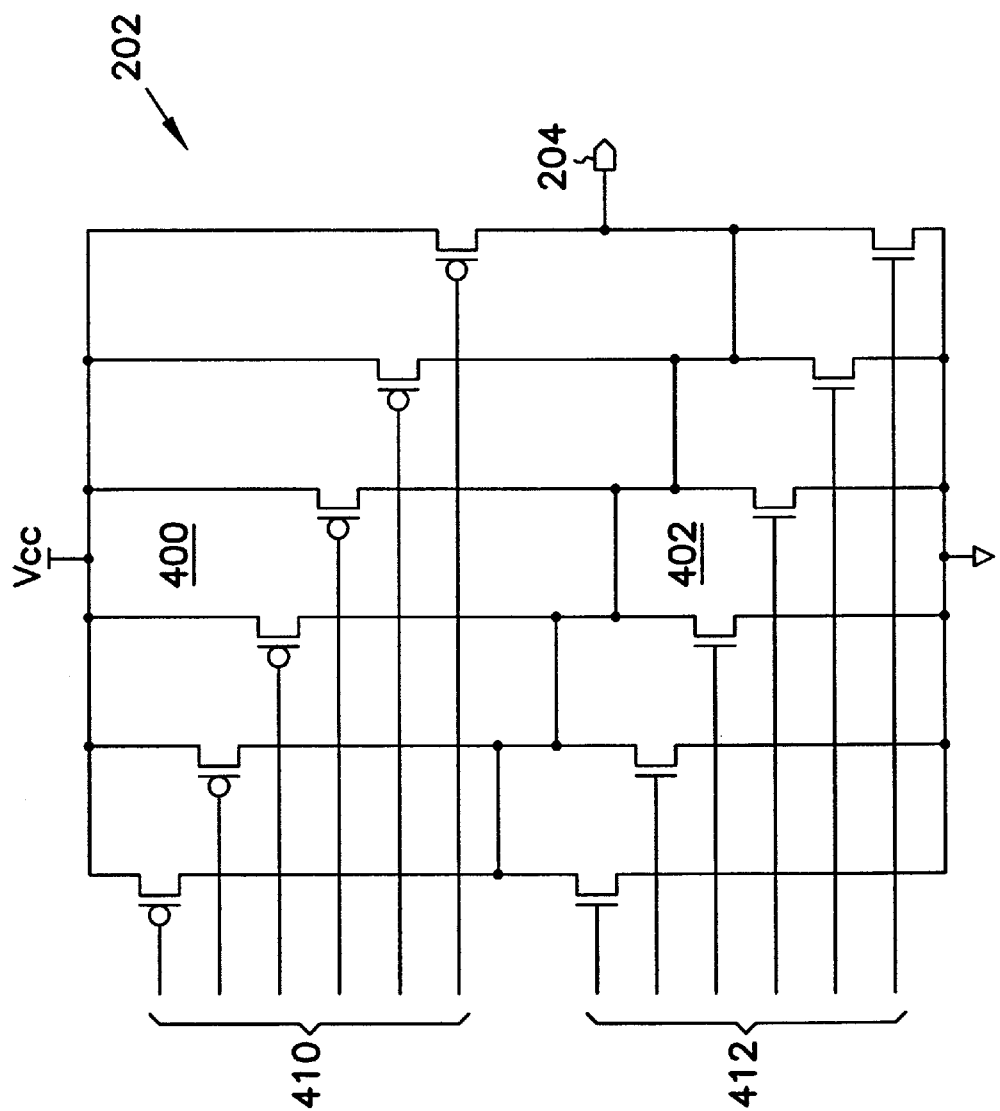
FIG. 4 is an electrical schematic diagram of a center-tapped termination circuit according to an embodiment of the present invention.

The CTT 202 will now be described in more detail with reference to FIG. 4 according to an embodiment of the present invention. The CTT 202 includes six P-channel transistors 400 connected in parallel between a supply voltage Vcc and the terminal 204. Six N-channel transistors 402 are connected in parallel between the terminal 204 and a ground voltage of the computer system 100. The P-channel transistors 400 are controlled by a set of six control signals 410 provided on separate lines to the respective gates of the P-channel transistors 400. Likewise, the N-channel transis-tors 402 are controlled by a set of six control signals 412 provided on separate lines to the respective gates of the N-channel transistors 402. The control signals 410, 412 are generated by the compensation circuit 210 and transmitted by the update circuit 208 on a set of lines <0:11> rather than the single line shown in FIG. 2. The control signals 410, 412 are selected such that at least one of the P-channel transistors 400 and at least one of the N-channel transistors 402 will be switched on at any one time so that the terminal 204 will float at a center-tapped voltage that is midway between Vcc and ground if the line is not being driven by another device. The devices in the computer system 100 are similarly configured such that signals on the bus 112 swing around the center-tapped voltage. If the devices are terminated by circuits similar to the CTT 202 then the voltage on each bus line may swing between a voltage below Vcc and a voltage above ground due to the voltage drops across the transistors 400, 402. One skilled in the art having the benefit of this description will also recognize that the CTT 202 may also include resistors and transistors of different types. For example, the CTT 202 could be comprised of N-channel transistors, P-channel transistors, BJT or JFET transistors, or a combination of one or more of the above-listed transistors, or a combination of resistors and one or more of the above-listed transistors.

One skilled in the art having the benefit of this description will recognize that a change in the supply voltage Vcc or a change in a temperature of an integrated circuit chip including the CTT 202 may change the impedance of the transistors 400, 402. In addition, the process parameters under which the integrated circuit chip is fabricated may affect the impedance of the transistors 400, 402. The control signals 410, 412 are therefore selected by the compensation circuit 210 to switch the transistors 400, 402 on and off to substantially reduce a difference between the impedance of the CTT 202 and the impedance of the line to accommodate for these factors.

The protocol may be designed to change the states of different groups of the transistors 400, 402, on different edges of the strobe signal according to alternative embodiments of the invention. Referring to FIG. 3A again, the states of the P-channel transistors 400 are updated by changing the control signals 410 after a rising edge in the strobe signal 300 is detected to reduce the voltage drop across those transistors during the update. The states of the N-channel transistors 402 are then updated after a falling edge in the strobe signal 300 is detected to similarly reduce the voltage drop during the update. The update of the transistors 400, 402 in separate groups may take place following either a critical set of rising and falling edges, a non-critical set of rising and falling edges, or any combination thereof. According to other embodiments of the invention, the transistors 400, 402 may be updated together following the detection of a critical or a non-critical edge in the strobe signal 300. A non-critical edge may be chosen to prevent an update from occurring when data is being latched. In addition, the above-mentioned embodiments of the invention are equally applicable in the context of an active low strobe signal such as the strobe signal 308 shown in FIG. 3C, or a strobe signal with only critical edges such as the strobe signal 304 shown in FIG. 3B.

Figure 5:
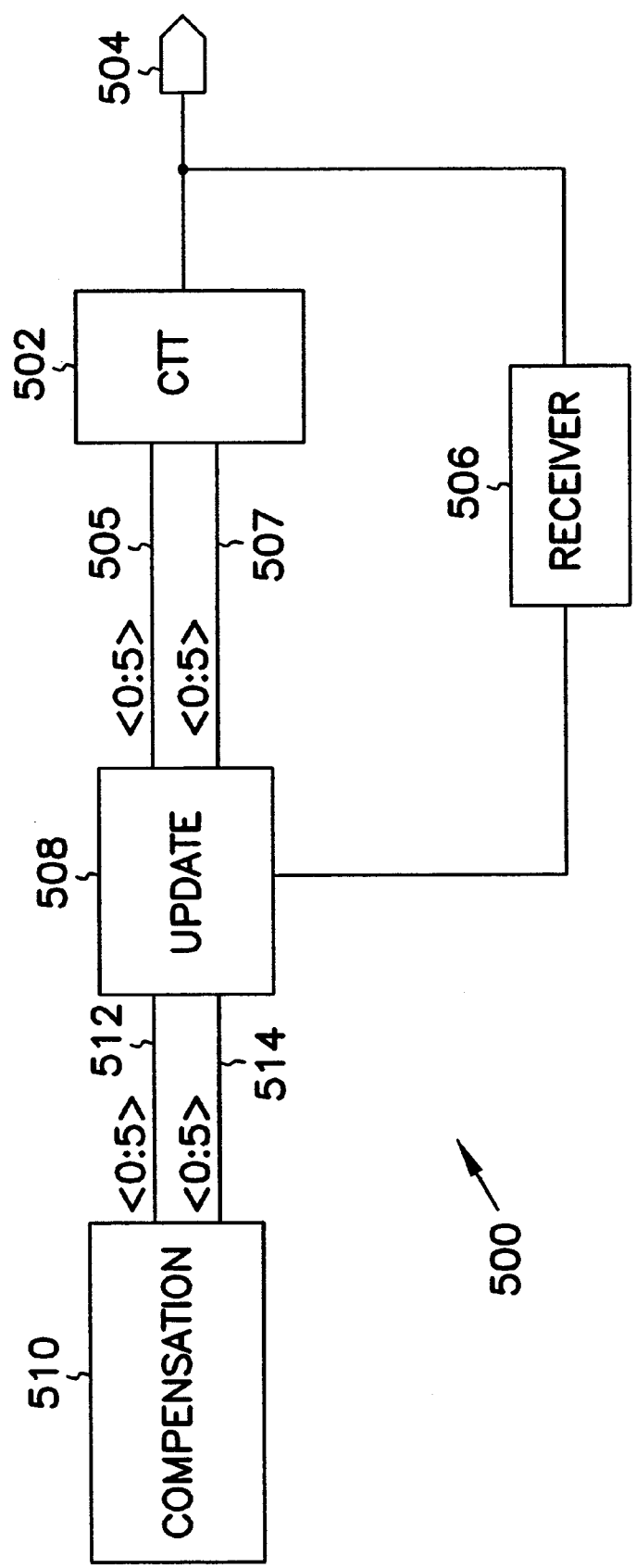
FIG. 5 is a block diagram of a receiver system according to an embodiment of the present invention.

A receiver system 500 according to another embodiment of the present invention is shown in FIG. 5. The receiver system 500 includes a CTT 502 connected to a terminal 504 of a line in a bus. The CTT 502 includes 6 P-channel transistors controlled by control signals received on a set of lines 505 and 6 N-channel transistors controlled by control signals received on a set of lines 507 coupled to the CTT 502. The terminal 504 is also connected to an input of a receiver circuit 506. The receiver circuit 506 has an output connected to, among other signal processing circuits (not shown), an input of an update circuit 508. The update circuit 508 is connected to the CTT 502 through the lines 505,507 and to a compensation circuit 510 through two sets of lines 512,514. The receiver system 500 operates in a manner similar to the operation of the receiver system 200 described above with respect to FIG. 2. The receiver circuit 506 is a buffer such as an inverter, and the update circuit 508 includes an edge detector circuit for detecting an edge in a signal at the terminal 504 that is transmitted by the receiver circuit 506. The update circuit 508 transmits the control signals from the lines 512,514 to the lines 505,507 and the CTT 502 with sequential circuitry when an appropriate edge or group of edges are detected.

Figure 6:
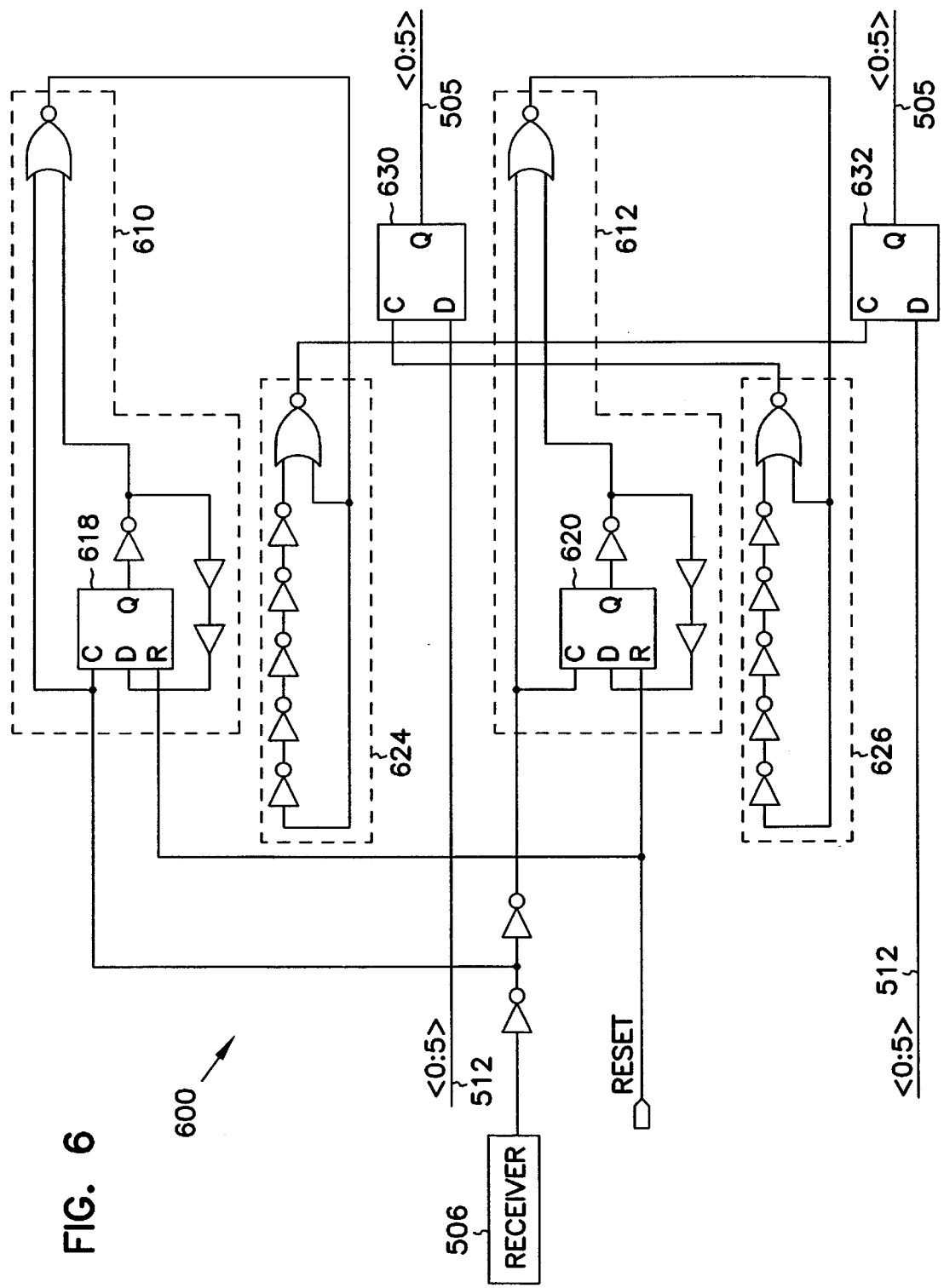
FIG. 6 is an electrical schematic diagram of an update circuit according to an embodiment of the present invention.

An update circuit 600 is shown in FIG. 6 according to another embodiment of the present invention. Connections with elements in FIG. 5 are shown with reference characters from FIG. 5. Two edge detector circuits 610,612 each have a sequential circuit such as a resetable flip flop circuit 618,620 for detecting an edge in an input signal. The update circuit 600 also includes two delay circuits 624,626, and a sequential circuit including two flip flop circuits 630,632 for transmitting control signals when the edge is detected. One skilled in the art having the benefit of this description will understand the operation of the update circuit 600.

Figure 7:
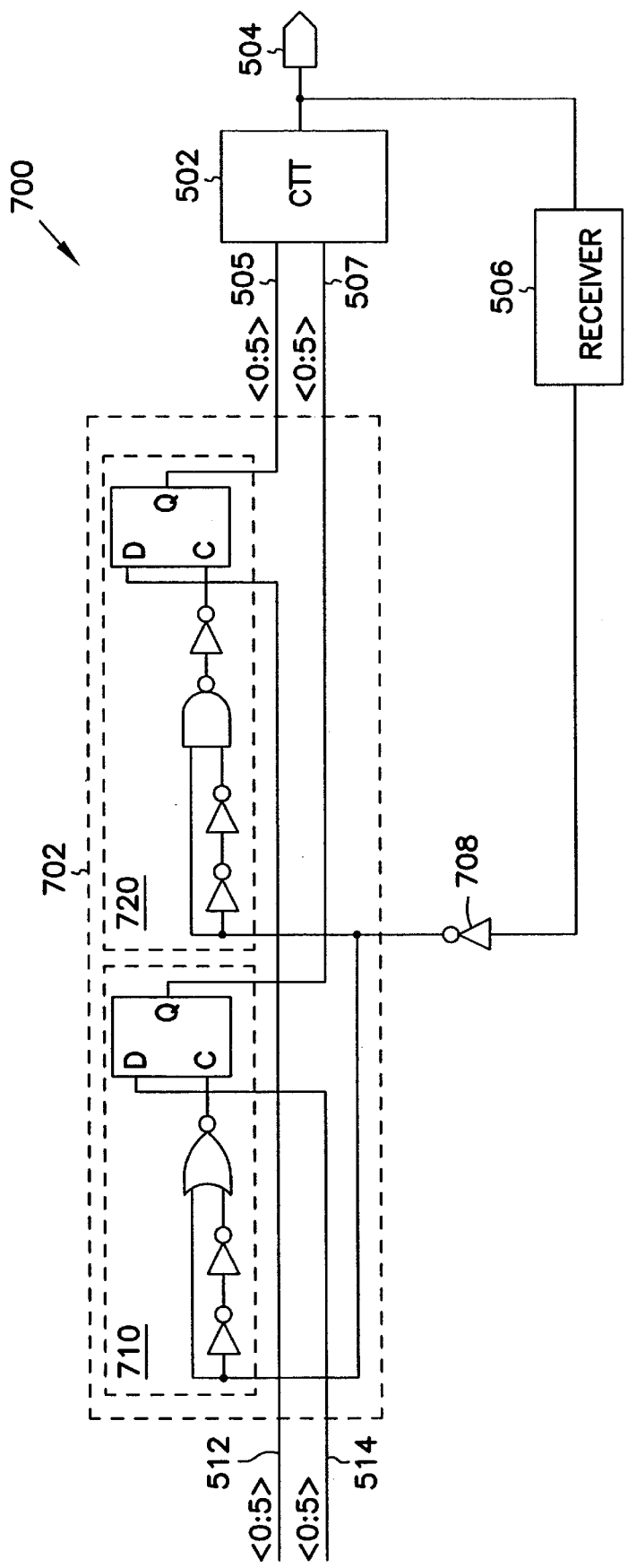
FIG. 7 is an electrical schematic diagram of an update circuit in a block diagram of a receiver system according to an embodiment of the present invention.

A receiver system 700 according to another embodiment of the present invention is shown in FIG. 7. Connections with elements in FIG. 5 and elements in common with FIG. 5 are shown with reference characters from FIG. 5. The receiver system 700 includes an update circuit 702 with edge detector circuitry for detecting a falling edge or a rising edge in an input signal provided directly from the terminal 504. The receiver circuit 506 provides the input signal through an inverter to a falling edge detector circuit 710 that relays control signals for N-channel transistors in the CTT 502 from the lines 514 to the lines 507 when a falling edge in the input signal is detected. The input signal is also provided to a rising edge detector circuit 720 that relays control signals for P-channel transistors in the CTT 502 from the lines 512 to the lines 505 when a rising edge in the input signal is detected. Other elements of the receiver system 700 are similar to the corresponding elements of the receiver system 500 shown in FIG. 5, and operate in a similar manner. One skilled in the art having the benefit of this description will understand the operation of the receiver system 700.

Figure 8:
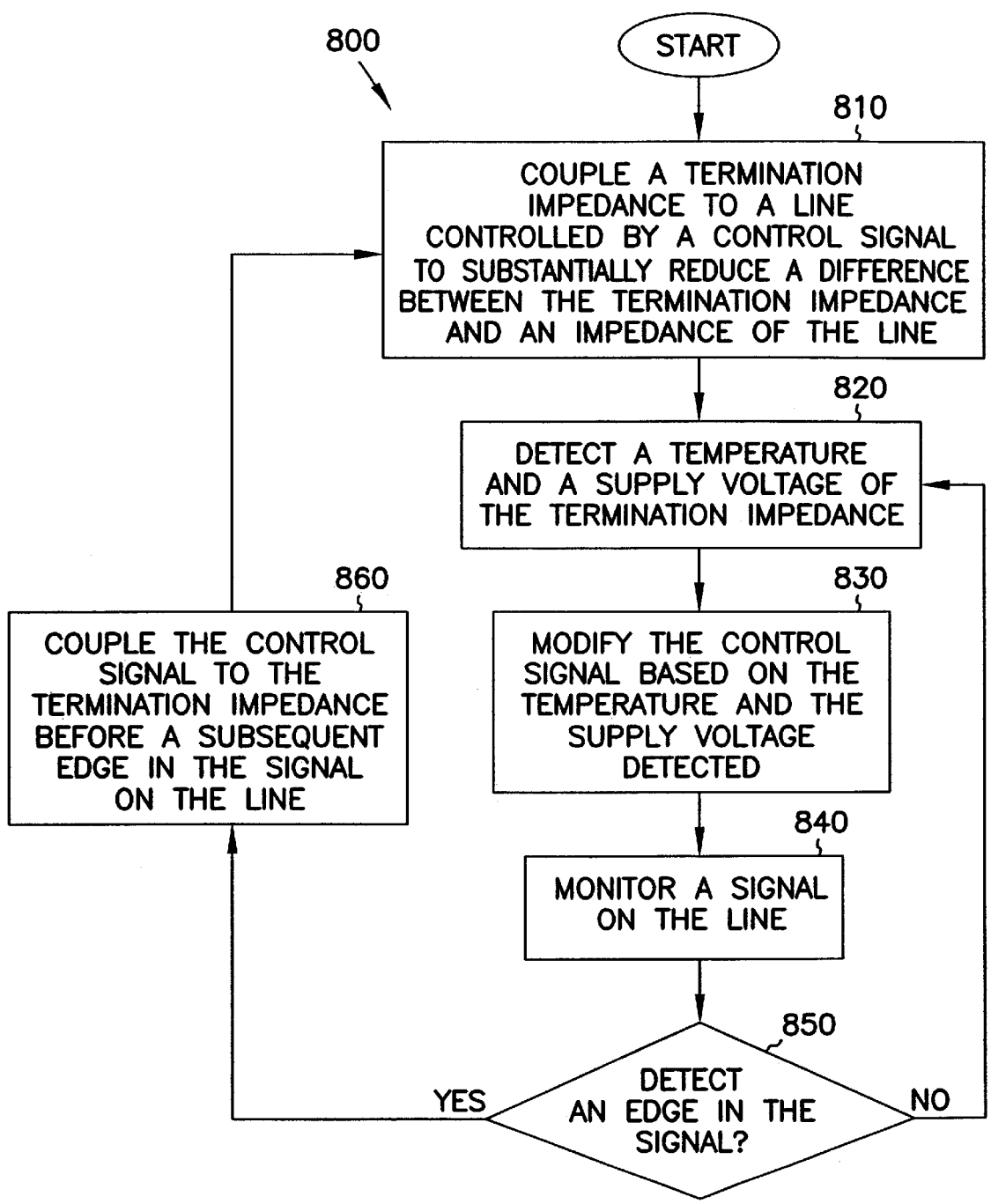
FIG. 8 is a flowchart of a method according to an embodiment of the present invention.

A flowchart of a method 800 according to an embodiment of the invention is shown in FIG. 8. In step 810 a termination impedance is coupled to a line in a bus, the termination impedance being controlled by a control signal so as to substantially reduce a difference between the termination impedance and an impedance of the line. The control signal controls the termination impedance to account for a supply voltage provided to the termination impedance, a temperature of the termination impedance, and any other factors affecting the termination impedance. For example, if the termination impedance is fabricated as part of an integrated circuit chip, the parameters of the process in which the integrated circuit chip was fabricated may affect it.

In step 820 the temperature and the supply voltage of the termination impedance are detected. In step 830 the control signal is modified based on the temperature and supply voltage detected, and in step 840 a signal is monitored on the line. If an edge is detected in the signal in step 850 then the method 800 continues to step 860 where the control signal is coupled to the termination impedance to update it based on a new temperature or supply voltage before a subsequent edge in the signal can occur. The signal is comprised of a series of pulses, each pulse having a duration defined in a protocol such that step 860 can be carried out without the danger of another edge occurring unexpectedly in the signal. The method 800 then returns to step 810 where the updated termination impedance is coupled to the line to substantially reduce the difference between the termination impedance and the impedance of the line. If no edge in the signal is detected in step 850 the method 800 returns to step 820 where the temperature and supply voltage continue to be detected. The method 800 provides for an update of the termination impedance following the detection of an edge in the signal such that the signal is not disturbed when the termination impedance is updated.

One skilled in the art having the benefit of this description will understand that the method 800 may be carried out for any line in a bus and for any signal that a bus carries. The method 800 may be modified according to any of the embodiments of the invention described above, and may be implemented in many different ways. For example, the method 800 may be implemented with the circuitry shown in the preceding FIGS. 1–7. The method 800 may also be implemented as a series of programmable instructions stored and implemented in the computer system 100. All of the embodiments of the present invention described, including the method 800, may be implemented with types of circuitry other than the circuitry shown in FIGS. 1–7. For example, the embodiments of the present invention may be implemented in hardware including one or more of the following: hardwired logic, a Field Programmable Gate Array (FPGA), a hardwired FPGA, programmable logic, a programmable microcontroller, an Application Specific Integrated Circuit (ASIC), a Read Only Memory (ROM), or a sequencer, or any suitable combination thereof.

Figure 9:
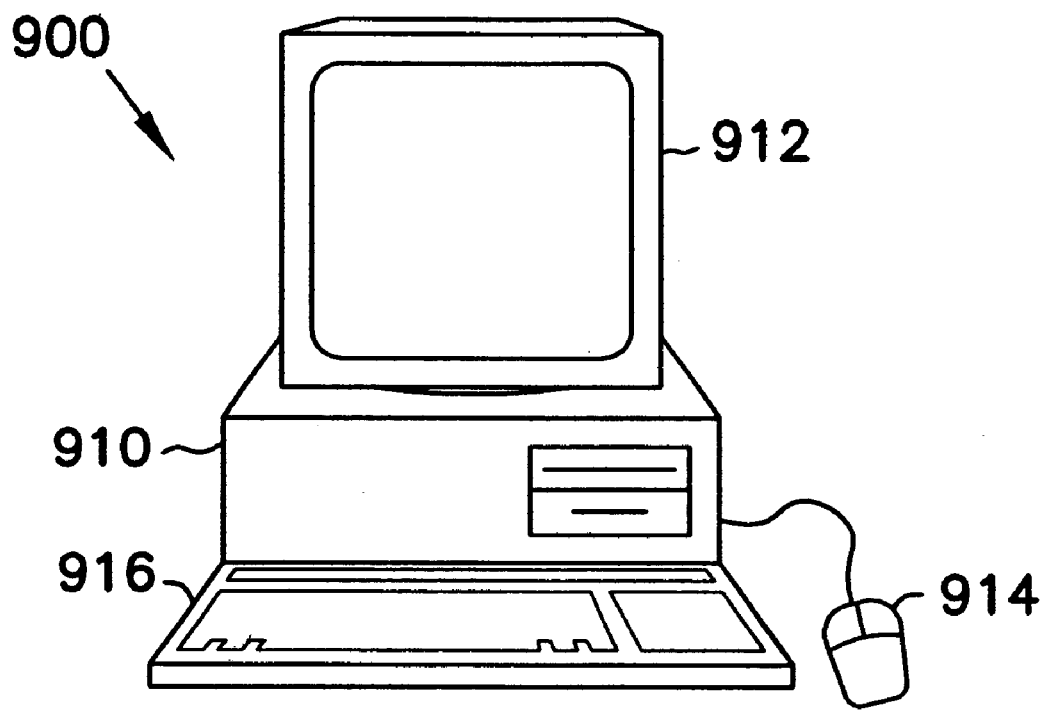
FIG. 9 is a block diagram of a computer system according to an embodiment of the present invention.

A computer system 900 is shown in FIG. 9 which includes the embodiments of the present invention described above alone or in combination with each other, and is operated according to the embodiments of the present invention described above. The computer system 900 includes a computer 910 that is operatively coupled to a monitor 912, a pointing device 914, and a keyboard 916. The computer 910 includes a processor, a random-access memory (RAM), a read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The present invention is not particularly limited to one type of computer 910. The computer 910 is desirably a PC-compatible computer. The construction and operation of such computers are well known within the art. Those skilled in the art having the benefit of this description can appreciate, however, that the present invention is not limited to an implementation in conjunction with the computer 910, and that the present invention may be practiced with any computerized system including a bus. Such computerized systems may include, for example, a video game, a hand-held calculator, a personal computer, or a multi-processor supercomputer, or an information appliance such as, for example, a cellular telephone, a pager, or a daily planner or organizer, or an information component such as, for example, a magnetic disk drive or telecommunications modem, or other appliance such as, for example, a hearing aid, washing machine or microwave oven having an electronic controller.

The monitor 912 permits the display of information within a viewing area, including computer, video and other information, for viewing by a user of the computer system 900. The present invention is not limited to any particular monitor 912, and the monitor 912 is one type of display device that may be used in a system with the present invention. Such monitors include cathode ray tube (CRT) displays, as well as flat panel displays such as liquid crystal displays (LCD's). The pointing device 914 permits a control of the screen pointer provided by a graphical user interface. The present invention is not limited to any particular pointing device 914. Such pointing devices include mouses, touch pads, trackballs, wheels, remote controls and point sticks. Finally, the keyboard 916 permits entry of textual information into the computer 910, as known within the art, and the present invention is not limited to any particular type of keyboard.

The embodiments of the invention described above implement termination for a bus without impairing the transfer of a signal over the bus. The termination is updated after an edge in the signal is detected and before a subsequent edge is expected. The change in the impedance of the termination circuit does not occur while an edge in the signal is arriving, so each edge in the signal can be detected without interference or corruption.

Although specific embodiments have been illustrated and described herein, it will be appreciated by those skilled in the art having the benefit of this description that any arrangement which is calculated to achieve the same purpose may be substituted for the specific embodiments shown. This application is intended to cover any adaptations or variations of the present invention. It is manifestly intended that this invention be limited only by the following claims and equivalents thereof.

What is claimed is:

1. A computer system comprising:
   a termination circuit having a variable impedance and being coupled to a line in a bus;
   a compensation circuit to generate a compensation signal based on operating conditions of the computer system;
   an update circuit coupled between the line, the compensation circuit, and the termination circuit to detect a signal on the line and to couple the compensation signal to the termination circuit to change the variable impedance after detecting an edge in the signal on the line.

2. The computer system of claim 1 wherein the signal on the line comprises a strobe signal having either a critical edge or a non-critical edge to be detected by the update circuit.

3. The computer system of claim 1 wherein the compensation circuit comprises a temperature detection circuit for detecting a temperature of the computer system and a voltage detection circuit for detecting a supply voltage in the computer system to generate the compensation signal based on the temperature and the supply voltage.

4. The computer system of claim 1 wherein the bus comprises control lines, data lines, and address lines.

5. The computer system of claim 1, further comprising a receiver circuit coupled between the update circuit and the line to receive the signal on the line.

6. The computer system of claim 5 wherein:
   the receiver circuit comprises a buffer; and
   the update circuit comprises:
      an edge detector circuit coupled to the receiver circuit to detect an edge in the signal on the line; and
      a sequential circuit coupled to the edge detector circuit, the compensation circuit, and the termination circuit to couple the compensation signal to the termination circuit after the edge detector circuit detects the edge in the signal on the line.

7. The computer system of claim 6 wherein:
   the compensation signal comprises a plurality of control signals;
   the termination circuit comprises a plurality of P-channel transistors coupled in parallel between a supply voltage and the line, each P-channel transistor having a control terminal coupled to receive a respective one of the control signals to determines its state, and a plurality of N-channel transistors coupled in parallel between the line and a ground voltage, each N-channel transistor having a control terminal coupled to receive a respective one of the control signals to determines its state; and
   the control signals determine the states of the P-channel and N-channel transistors to determine the variable impedance of the termination circuit.

8. The computer system of claim 1, further comprising:
   a processor connected to the bus;
   an input/output device connected to the bus;
   a memory device connected to the bus; and
   wherein the termination circuit, the compensation circuit, and the update circuit are located in at least one of the processor, the input/output device, and the memory device.

9. A circuit comprising:
   a termination circuit coupled to a line and having an impedance determined by a control signal received in the termination circuit; and
   a control circuit coupled between the line and the termination circuit to generate the control signal based on operating conditions of the circuit, to detect a signal on the line, and to couple the control signal to the termination circuit after detecting an edge in the signal on the line.

10. The circuit of claim 9 wherein the line comprises a strobe line and the signal on the line comprises a strobe signal.

11. The circuit of claim 9 wherein the control circuit includes a receiver circuit coupled to the line to receive the signal.

12. The circuit of claim 11 wherein the receiver circuit comprises a buffer.

13. The circuit of claim 11 wherein the control circuit comprises:
   a compensation circuit to generate the control signal based on the operating conditions of the circuit; and
   an edge detector circuit to detect the edge in the signal on the line.

14. The circuit of claim 13 wherein the control circuit further comprises a sequential circuit coupled to the edge detector circuit, the compensation circuit, and the termination circuit to couple the control signal to the termination circuit after the edge detector circuit detects the edge in the signal on the line.

15. The circuit of claim 14 wherein:
   the control signal comprises a plurality of P-channel control signals and a plurality of N-channel control signals generated based on a temperature and the supply voltage of the circuit;
   the termination circuit comprises a plurality of P-channel transistors coupled in parallel between a supply voltage and the line, each P-channel transistor having a control terminal coupled to receive a respective one of the P-channel control signals, and a plurality of N-channel transistors coupled in parallel between the line and a ground voltage, each N-channel transistor having a control terminal coupled to receive a respective one of the N-channel control signals; and the P-channel control signals and the N-channel control signals determine states of the P-channel transistors and the N-channel transistors to determine the impedance of the termination circuit.

16. A method comprising:

damping a signal on a line;

detecting an edge in the signal on the line; and modifying the damping after detecting the edge in the signal on the line and before detecting a subsequent edge in the signal on the line.

17. The method of claim 16 wherein damping a signal comprises coupling an impedance to the line that is not substantially different from an impedance of the line.

18. The method of claim 16 wherein modifying the damping comprises modifying an impedance coupled to the line after detecting the edge in the signal on the line and before detecting a subsequent edge in the signal on the line to substantially reduce a difference between the impedance and the impedance of the line.

19. The method of claim 16 wherein detecting an edge in the signal comprises detecting an edge in a strobe signal on the line.

20. The method of claim 19 wherein modifying the damping comprises modifying an impedance coupled to the line after a critical edge in the strobe signal and before a subsequent edge in the strobe signal or after a non-critical edge in the strobe signal and before a subsequent edge in the strobe signal.

21. The method of claim 16 wherein modifying the damping comprises:

detecting a rising edge in the signal on the line and detecting a falling edge in the signal on the line;

switching on one or more P-channel transistors coupled in parallel between a supply voltage and the line and switching on one or more N-channel transistors in parallel between a ground voltage and the line;

detecting a temperature of the P-channel and N-channel transistors;

detecting the supply voltage;

changing the number of P-channel transistors that are switched on after the rising edge is detected based on the temperature and supply voltage; and changing the number of N-channel transistors that are switched on after the falling edge is detected based on the temperature and supply voltage.

22. A method for operating a computer system comprising:

sending a signal on a line in a bus between two devices in the computer system;

substantially reducing a difference between a termination impedance coupled to the line and an impedance of the line;

detecting an edge in the signal on the line; and modifying the termination impedance after the edge in the signal on the line is detected and before a subsequent edge in the signal on the line to substantially reduce the difference between the termination impedance and the impedance of the line.

23. The method of claim 22 wherein detecting the signal on the line comprises detecting a strobe signal on the line.

24. The method of claim 22 wherein modifying the termination impedance comprises modifying the termination impedance coupled to the line either after a critical edge in a strobe signal has been detected or after a non-critical edge in the strobe signal has been detected.

25. The method of claim 22 wherein modifying the termination impedance comprises:

switching on one or more P-channel transistors coupled in parallel between a supply voltage and the line and switching on one or more N-channel transistors coupled in parallel between a ground voltage and the line;

detecting a rising edge in the signal on the line and detecting a falling edge in the signal on the line;

detecting a temperature of the P-channel and N-channel transistors;

detecting the supply voltage;

changing the number of P-channel transistors that are switched on after detecting the rising edge in the strobe signal based on the temperature and supply voltage; and changing the number of N-channel transistors that are switched on after detecting the falling edge in the strobe signal based on the temperature and supply voltage.

26. The method of claim 22 wherein sending a signal comprises sending a signal on a line in a bus between a processor and a memory device in the computer system.

27. The method of claim 22 wherein sending a signal comprises sending a signal on a line in a bus between a processor and an input/output device in the computer system.

* * * * *